(12) United States Patent
Blue et al.

(10) Patent No.: US 6,663,826 B1
(45) Date of Patent: Dec. 16, 2003

(54) METHOD OF HIGH-DENSITY FOIL FABRICATION

(75) Inventors: Craig A. Blue, Knoxville, TN (US); Vinod K. Sikka, Oak Ridge, TN (US); Evan K. Ohriner, Knoxville, TN (US)

(73) Assignee: Ut-Battelle, LLC, Oak Ridge, TN (US)

( * ) Notice: Subject to any disclaimer, the term of this patent is extended or adjusted under 35 U.S.C. 154(b) by 8 days.

(21) Appl. No.: 09/614,889

(22) Filed: Jul. 12, 2000

(51) Int. Cl.⁷ ................................................. B22F 3/18
(52) U.S. Cl. .............................. 419/3; 425/78; 264/669
(58) Field of Search .................. 419/3; 425/78; 264/669

(56) References Cited

U.S. PATENT DOCUMENTS

| | | | |
|---|---|---|---|
| 3,330,654 A | | 7/1967 | Sweet |
| 3,720,511 A | | 3/1973 | Davies et al. |
| 3,935,017 A | * | 1/1976 | Gardner .................. 106/46 |
| 4,003,716 A | | 1/1977 | Steigelman et al. |
| 4,691,856 A | * | 9/1987 | Haramaki et al. .......... 228/194 |
| 4,965,092 A | * | 10/1990 | Hayduk, Jr. et al. ......... 427/96 |
| 5,864,119 A | * | 1/1999 | Vogt et al. .................. 219/388 |
| 6,143,241 A | * | 11/2000 | Hajaligol et al. ............. 419/31 |
| 6,200,523 B1 | * | 3/2001 | Quick et al. .................. 419/2 |

FOREIGN PATENT DOCUMENTS

| DE | 22 00 971 | 6/1973 |
|---|---|---|
| DE | 38 22 883 | 1/1990 |

* cited by examiner

*Primary Examiner*—Daniel J. Jenkins
(74) *Attorney, Agent, or Firm*—Akerman Senterfitt

(57) ABSTRACT

A method for preparing flat foils having a high density includes the steps of mixing a powdered material with a binder to form a green sheet. The green sheet is exposed to a high intensity radiative source adapted to emit radiation of wavelengths corresponding to an absorption spectrum of the powdered material. The surface of the green sheet is heated while a lower sub-surface temperature is maintained. An apparatus for preparing a foil from a green sheet using a radiation source is also disclosed.

36 Claims, 8 Drawing Sheets

METHOD OF HIGH-DENSITY FOIL FABRICATION

STATEMENT REGARDING FEDERALLY SPONSORED RESEARCH OR DEVELOPMENT

This Invention was made with government support under contract DE-AC05-00OR22725, awarded by the United States Department of Energy to UT-Battelle, LLC, and the United States Government has certain rights in this invention.

CROSS-REFERENCE TO RELATED APPLICATIONS (Not Applicable)

1. Field of the Invention

This invention relates generally to the preparation of high density foils, and more particularly to a method for preparing such foils from powders using high intensity radiant power.

2. Background of the Invention

The application of foils to various defense and commercial applications is well known. For example, the heat resistant properties of high strength metal alloys such as titanium aluminide make this material ideally suited for use in fighter jets. Other applications for high strength heat resistant composites include aerospace structural components, turbine engine components and optical mechanical components.

Presently, there exists many known refractory, composite and advanced intermetallic materials, such as titanium aluminide, which cannot be readily formed into foils by conventional foil fabrication techniques due to the extraordinary costs associated with the extensive thermal mechanical processing that is required by current processes. For example, a conventional ingot process to form 0.01 thick inch TiAl foil costs approximately $10,000 per square foot. In many cases, the extreme costs completely eliminate any commercial use of the material even though the material might possess outstanding properties in the area of interest. Some materials are inherently difficult to process. For example, intermetallics have very high work hardening rates and low room temperature ductilities making them difficult to process. Consequently, difficult to process materials such as intermetallics are currently only prepared for niche markets because known preparation methods are not cost effective.

Although some processing techniques exist to form foils such as processing used to form high-temperature fiber reinforced metal matrix composites ("MMCs") foils, MMC foils appeal to a very limited market because such foils are expensive to fabricate and the fabrication is time consuming. Typically in an MMC process, ceramic fibers are coated with a metal matrix by a process such as plasma spray deposition or sputtering. Even if these processes perform well, they result in intermediate materials which are not useful in engineering applications, due in part to the presence of significant residual porosity. Substantial further processing, such as one or more hot pressing/diffusion bonding steps are generally required to compact these intermediate materials into reasonably dense components. Conventional powder techniques are also generally available for forming quality foils. However, conventional powder processing is also expensive and time consuming.

Conventional powder processing techniques typically involve the initial formation of a green sheet preform through the mixture of a powder and a polymer binder. The green sheet is placed in a vacuum furnace where the binder is burned off. Burn-off conditions may be chosen to result in some pre-sintering of the powder. A higher temperature sinter step is then performed to allow bonding of the powder material through solid state diffusion. The sheet is then rolled, re-sintered and this process of rolling and re-sintering is repeated several times. Vacuum annealing steps are required to relieve the stress produced from rolling the sheet. Typical sintering times are 13 hours for each sintering step. Thus, this technique may require several days to complete.

While the aforementioned techniques and several others are generally available for forming some foils with reasonable mechanical characteristics, they all share the undesirable characteristics of being time consuming and very expensive. A need exists for a method of preparing foils that is rapid, inexpensive and results in superior film properties. It would be advantageous for such a method to also be easy to control and adaptable for use with a wide variety of materials.

SUMMARY OF THE INVENTION

A method for preparing a high density foil which utilizes high intensity radiant power is provided. Initially, a green sheet preform is made by cold green casting a powder with a liquid suspension medium, such as a polymer, which functions as a binder. The green sheet is loaded into a process chamber. The green sheet is then exposed to a radiation source which emits wavelengths of radiation which are preferentially absorbed by the powder material, resulting in heating the green sheet and formation of a foil on a comparatively cold process chamber surface which acts as a cold hearth. The foil can then be cooled in the process chamber prior to removal.

If the binder material selected is a polymer, it may be reduced to residual carbon prior to exposure of the sheet to significant radiation with the addition of a preheat step. To produce a large area of uniform heat flux, the radiation source, the process chamber or both the radiation source and the process chamber may be translated relative to each other.

If the material of interest is susceptible to oxidation, non-oxidizing gases selected from the group consisting of hydrogen and noble gases may be used to create an inert atmosphere for processing. Carefully controlled radiation rapidly heats the surface of the green sheet while the temperature of the green sheet subsurface and the process chamber remains at substantially lower temperatures. The foil may be formed by either melting the surface of the green sheet or simply heating the surface below the melting point of the powder. The radiation intensity and time parameters are expected to depend on the material being prepared and the desired foil characteristics. If a rapid process is desired, radiation parameters are chosen to melt the surface of the sheet. In this embodiment, the molten layer diffuses into the non-molten layer allowing the foil formed to retain a flat form. As used herein, diffusion is defined to include liquid state diffusion as well as solid state diffusion. As an alternative embodiment, the green sheet can be sintered so that only solid state diffusion occurs. However, this method generally requires several sintering and rolling steps to form a foil with the desired level of densification. Foil densification levels are generally referenced to single crystal values. For example, a foil densification level of 98% represents a foil density equal to 98% of the density of the same material in single crystal form.

Power densities of the radiant source will generally be from approximately 0.3 to 3.5 kW/cm² and the thickness of the foil formed is approximately 1 to 4000 microns. If the sheet is not fully dense after one pass under the lamp, the material may be cold rolled and passed back under the lamp. Cold rolling is frequently used when sintering alone is used to attain desired foil characteristics.

The process chamber may be made from aluminum. Aluminum is inexpensive and malleable. The process chamber is designed to have one or more openings to allow transmission of radiation inside the process chamber. Quartz may be chosen as a suitable radiation transparent material. The process chamber may include cooling structure to prevent melting of the process chamber. A circulating cooling fluid may be used to cool the process chamber.

In an alternate embodiment of the present invention, a method is provided for the continuous or near continuous formation of a foil. In this embodiment, a roll of green sheet is fed through a process chamber adapted to allow passage of the green sheet therethrough. Radiation processing and cooling are preferably performed within the process chamber.

BRIEF DESCRIPTION OF THE DRAWINGS

Features and advantages of the present invention will become apparent to those skilled in the art from the following description with reference to the drawings, in which.

DETAILED DESCRIPTION OF PREFERRED EMBODIMENTS

Figure 1A:
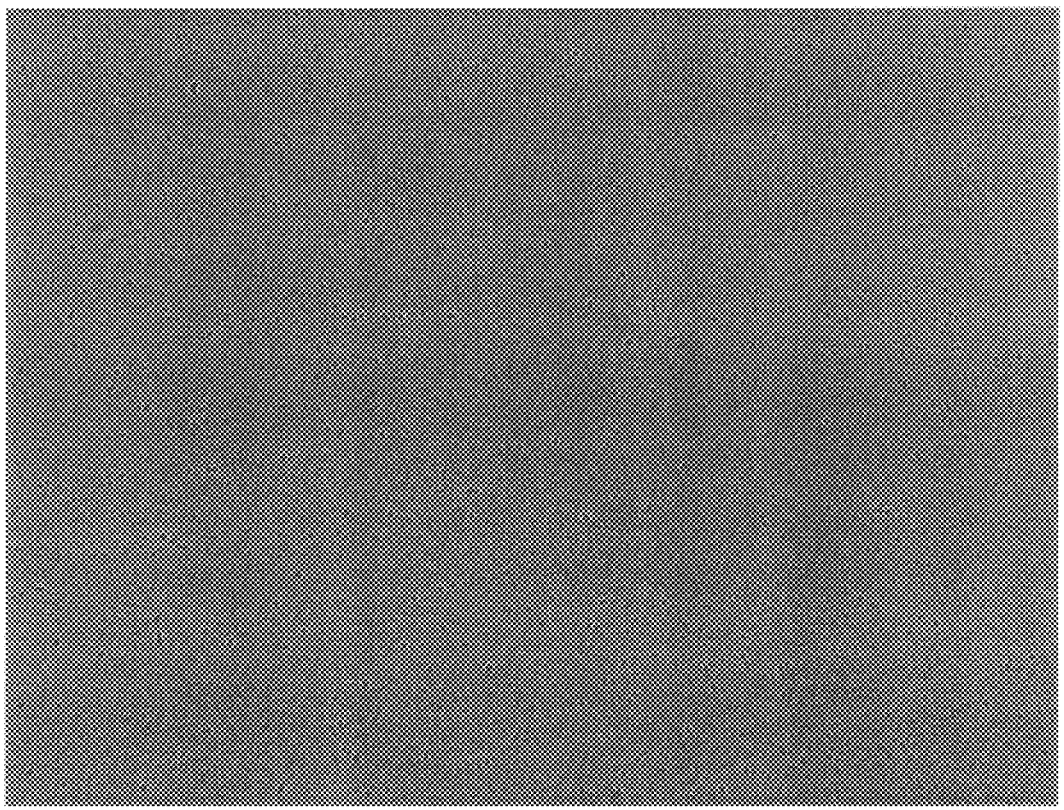
FIG. 1a, FIG. 1b, FIG. 1c and FIG. 1d illustrate cleaved samples demonstrating the formation of low porosity Fe—Cr sheet throughout the entire green sheet thickness using the process of the invention.
Figure 1B:
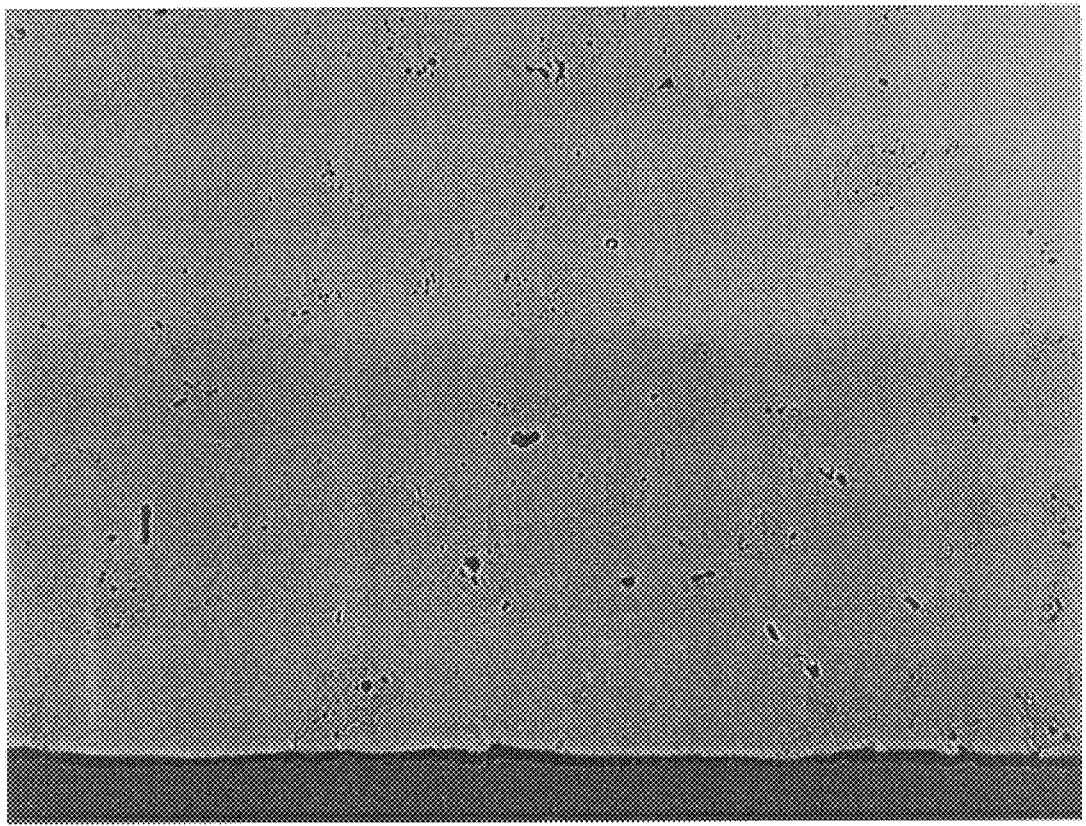
Figure 1C:
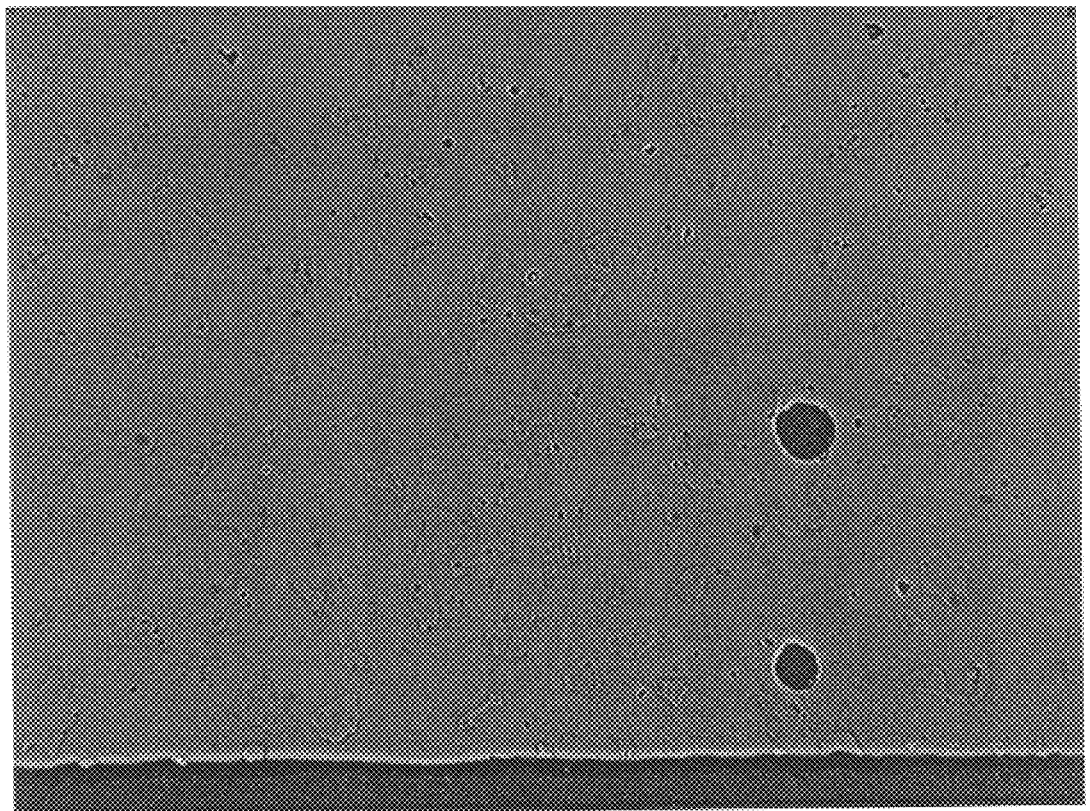
Figure 1D:
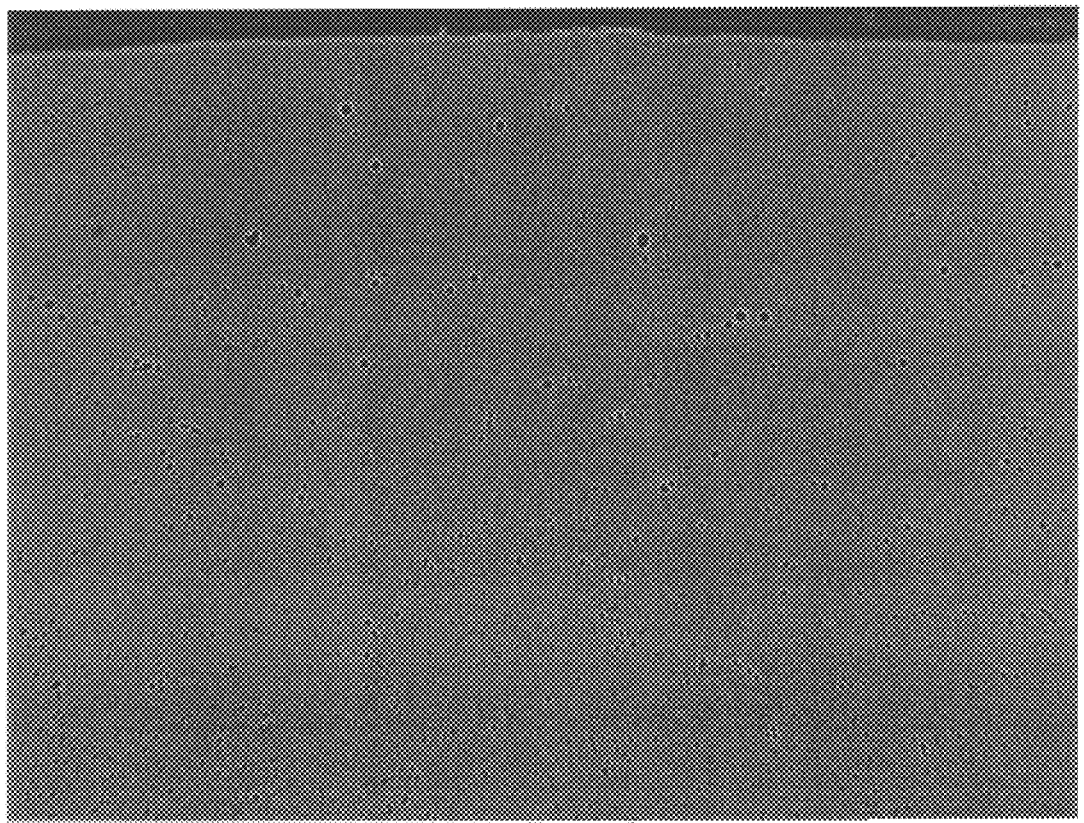

A method is provided for preparing foils from materials such as metals, ceramics, cermets and other composites using high intensity radiation applied to a green sheet containing a powder of the desired material. The term "green sheet," as used herein, refers to a preform sheet form composed of a powder and binder having a low burnout temperature. The binder acts as to hold the green sheet together in the desired sheet form.

Suitable binder materials are those which vaporize at temperatures preferably below 400° C., leave minimal residue following vaporization and are relatively inexpensive. The binder chosen is typically a polymer binder. Typical binder materials are polytetrafluoroethylene based. Acitates, glycol and water-based materials may also be used as binders.

In most applications, the binder material is intentionally burned off in a preheat stage leaving only residual carbon, typically in the part per million range. The preheat step may be designed to allow some pre-sintering to occur as well. For most materials of interest, a temperature of at least 800° C. is required to produce any significant pre-sintering. At part per million levels, the carbon residue has no measurable effect on the properties of the final product.

If a preheat step is used, any energy source capable of providing sufficient energy to substantially vaporize the binder may be used. In the preferred embodiment of this invention, the preheat stage energy source is a dedicated preheat stage radiation system which utilizes tungsten halogen lamps because of the rapid heating rates offered by such lamps. Preheat is generally performed under a controlled atmosphere to eliminate potential oxidation. Tungsten halogen lamps can be selected that reach full power in approximately 0.75 seconds and offer power densities of at least 20 W/cm$^2$, enough to provide sufficient energy to reach typical binder burnout temperatures of approximately 400° C. at a green sheet feed rate of 1 cm/sec.

In contrast to commonly used foil fabrication processes, high intensity radiational heating provides a means for rapidly heating the surface of a green sheet while maintaining the green sheet subsurface and the process chamber material at a substantially lower temperature. Radiational heating is preferably performed in a heating furnace. A variety of radiation sources are available. For instance, Infrared Technologies, LLC, located in Oak Ridge, Tenn. manufactures specialized radiation furnaces which incorporate tungsten-halogen based sources.

A more powerful and preferred furnace, incorporating a plasma-based source, is manufactured by Vortek, Inc., of Vancouver, Canada. The plasma is contained in a quartz tube and the resulting radiation is directed to the green sheet using elliptical reflectors. This particular plasma-based furnace operates as a line-focus type system, whereby the green sheet is treated by scanning radiation across its surface. Minimal convective currents are produced in the heated material because the uniform area heated by the lamp alone is approximately 1.25 inches by 14 inches. Scanning the lamp over the green sheet may be used to increase the size of the uniformly heated area.

Any radiation source that produces sufficient radiation intensity and a spectrum of radiation capable of heating the surface of the green sheet to a temperature at or near the melting point of the green sheet material while allowing the green sheet subsurface to remain at a lower temperature can be used for the invention. In the preferred embodiment of the invention, the emitted radiation wavelengths range from approximately $0.2\,\mu$ to $1.4\,\mu$. Since $0.2\,\mu$ to $0.39\,\mu$ wavelength radiation is characterized as ultraviolet radiation, $0.39\,\mu$ to $0.78\,\mu$ visible radiation and $0.78\,\mu$ to $1.41\,\mu$ infrared radiation, ultraviolet radiation, visible radiation and infrared radiation can all be simultaneously radiated by the radiation source used in the preferred embodiment of the invention. However, the invention may be used with a narrower emitted wavelength range, such as almost entirely infrared, provided the radiation emitted is capable of heating the surface of the green sheet to a temperature at or near the melting point of the green sheet material.

An embodiment of the invention uses a process chamber designed as an enclosed box which allows passage of radiation therein and the ability to fill the enclosed volume with a user defined atmosphere. In one embodiment, the container is a metal container with an area of metal cut removed and replaced by a material substantially transparent to radiation emitted by the radiation source. In this embodiment of the invention, the container is preferably transparent to radiation having wavelengths in the range of approximately 0.1 to 5.0 microns. The container is filled with a non-oxidizing atmosphere prior to radiating. Aluminum is a good process chamber material due to its low cost, good ductility and high thermal conductivity. However, it has a relatively low melting point of approximately 660° C. and may require cooling to avoid melting. Water cooling may be employed to avoid melting the aluminum container and to help keep the green sheet subsurface from melting. Alternate cooling schemes may also be used. Quartz is a low cost material transparent to radiation on the order of 0.1 to 5.0 microns in wavelength. In the preferred embodiment of this invention, the process chamber is an aluminum container with a quartz window to allow transmission of the radiation to the green sheet. The process chamber is essentially closed, allowing the chamber volume to be filled with one or more non-oxidizing gases to prevent oxidation.

In another embodiment of the invention, the process box is made from a uniform material (without a substantially radiation transparent window) and the radiation source is contained within the process chamber. This is the preferred embodiment of the invention and is particularly useful in a production process.

The terms "loading" and "removing" as used herein, refer generally to the movement of the green sheet into the process chamber and movement out of the process chamber, respectively, and includes both a batch process and a continuous or near continuous process. In a batch process, a green sheet is placed completely inside the process chamber, radiated, cooled and then removed from the process chamber. The lamp may be scanned over the green sheet in a batch process. A second green sheet is then placed in the process chamber and the cycle repeated.

An alternative embodiment of the invention uses a continuous or nearly continuous process. A length of green sheet is passed under the process chamber at a user defined translation. The green sheet may be moved by a conveyor mechanism or by pulling the green sheet under slight tension. A green sheet translation rate of up to 5 cm/sec has been used in this embodiment of the invention. Since the green sheet is translated relative to the lamp, the lamp is not normally scanned in this embodiment of the invention. The process chamber is modified to include a slit on both sides of the box to allow passage of the green sheet thereunder. As in the batch process, radiation exposure and cooling of the green sheet is performed prior to leaving the non-oxidizing environment. Depending on the design of the process chamber, cooling under a non-oxidizing atmosphere may require the green sheet translation to cease for short periods of time after each green sheet length is radiated. Alternatively, a process chamber can be designed so that the radiated green sheet areas have sufficient time to cool within the process chamber while the green sheet is continuously moved. The material may also be pulled continuously through water cooled quench blocks outside the process chamber which are also held under a non-oxidizing atmosphere.

By maintaining the green sheet subsurface layer below a critical value approximately equal to the melting point of the powder, the green sheet is structurally modified while retaining its desired flat form. The temperature at which the green sheet is heated can be accurately controlled by varying the intensity of radiation and the time of exposure to the radiation source. In some radiation sources, green sheet heating may also be controlled by varying the distribution of emitted wavelengths. Heating parameters may be chosen to transform the entire thickness of green sheet material into a low porosity foil in a single pass under the radiation source, while avoiding contact angle formation of the liquid or liquid/solid. Contact angle formation may be avoided by maintaining at least a thin solid layer of green sheet material. If the chosen parameters of intensity and time result in completely melting the entire green sheet volume, the flat foil form may be lost and the component materials may even separate.

Alternatively, heating parameters may be chosen to transform the entire thickness of green sheet material into a low porosity foil in two or more passes under the radiation source, while avoiding contact angle formation of the liquid or liquid/solid. For example, it may be desirable to pass the green sheet material under the radiation source twice. Upon the first heating, radiant energy is applied to the top green sheet surface, resulting in melting at least approximately 50% of the green sheet thickness, but not the bottom portion of the green sheet. The green sheet is suitably cooled to solidify the entire green sheet. The green sheet is then repositioned so that the former green sheet top surface faces the bottom of the process chamber. Upon the second heating, radiant energy is applied to the current top green sheet surface, resulting in melting at least approximately 50% of the green sheet thickness, but not the current bottom portion of the green sheet. By using this two-step inversion process, the entire green sheet volume may be melted without contact angle formation. In addition, this method allows foil thicknesses of up to approximately 200% of the foil thickness otherwise attainable using a single step process.

The intensity of radiation and time of exposure to radiation will vary, depending on the material that is being processed and the desired characteristics of the foil. The preferred radiation intensity, or heat flux density, will generally range up to a maximum value of about 3.5 kW/cm$^2$. The presently preferred power range is from approximately 0.5 to 1.5 kW/cm$^2$. However, these variables are application specific and may be deviated from. The time of exposure to radiation determines the extent of melting or sintering of the green sheet. Therefore, time of exposure can be used to control both the thickness and final density and microstructure of the foil. Scan speed can be used to control exposure time. Typical scan speeds of the green sheet relative to the radiation source are 0.5 to 5.0 cm/sec and typical emitted power levels are 0.5 to 1.5 kW/cm$^2$.

High intensity radiational heating rapidly increases foil density by reducing the porosity of the foil. The step of radiational heating may be controlled to initiate various material micro-structure modifying mechanisms, including sintering and alloying. In the present method, "sintering" refers to densification and chemical bonding of adjacent particles which is effected by heating to a temperature below the melting point of material. If sintering conditions are used and the green sheet is not sufficiently dense after one pass under the lamp, the material may be cold rolled and passed back under the lamp. Cold-rolling is often used in conjunction with sintering to attain desired foil characteristics. Applied to elemental powders, the term "alloying" refers to heating the green sheet and may include heating the surface of the green sheet to a temperature above the melting point of the material to produce an interface comprising a mixture of the molten and non-molten layer. During alloying, the molten layer formed diffuses into the non-molten layer.

Powder sizes used generally range from about 5 $\mu$ to 80 $\mu$. Smaller particles heat and melt more rapidly. In the preferred embodiment, powder sizes range from approximately 5 $\mu$ to 20 $\mu$.

The invention is compatible with many different classes of materials. For example, foils may be formed from materials including ceramics, metals, metal alloys, cermets and composites. Ceramic coatings sometimes have a thermal shock problem whereby they fracture upon rapid heating or cooling. However, $MoSi_2$ foils have been successfully formed using the process and it is believed that ceramics having similar or better thermal shock properties compared to $MoSi_2$ will be compatible with the process. Foils made according to the invention can be prepared from virtually any metal, such as tungsten, iridium, tantalum, niobium, rhenium, nickel, iron and titanium. Metal alloys such as iron-chromium, iron-aluminum, nickel-aluminum and titanium-aluminum have been prepared using the process. It is believed that the refractory metal alloy of molybdenum-rhenium and several other refractory metal alloys could be prepared using the process. Cermets, such as chromium carbide with nickel alloy, chromium carbide with copper alloy, tungsten carbide with nickel alloy and tungsten carbide with copper alloy have also been prepared using the process. It is believed that composites such as carbon reinforced titanium alloys, silicon carbide reinforced titanium, and metals reinforced with alumina and other materials could be prepared using the process. Reinforcements to the composites can be in the form of continuous fiber, chopped fiber, whiskers or particles.

The present method can be performed in vacuum, air, or controlled and inert environments. However, when materials susceptible to oxidation are processed, a non-oxidizing atmosphere is recommended during radiant processing. In the preferred embodiment, argon-4% hydrogen is used. Pure argon or pure hydrogen could also be used, as well as many other non-oxidizing gases.

The method described herein has been successfully applied to a variety of metal alloys which, have proven difficult to form as foils. For example, the method has been used to form a nickel-based alloy foil containing 70 vol % tungsten carbide. The foil produced was 7 $\mu$m thick. The method of this invention is not limited to just metals. Cermets and composites foils can also be processed using this method, provided they can withstand the thermal processing.

The method has been successfully implemented to prepare a variety of foils. Some examples are provided below. Corresponding cross-sectional micrographs are provided for Examples 1 and 2 to further illustrate the successful implementation of the present method.

EXAMPLE 1

An iron chromium powder was combined with a fluorinated polymer based binder at room temperature to form a green sheet. A separate preheat stage was used. In the preheat stage, 33 kW of radiant power was applied to the green sheet for 2 minutes resulting in a green sheet surface temperature of approximately 400° C., which was sufficient to burn off the binder. The green sheet was then loaded into an aluminum process box having a quartz window and the box was scanned under the radiation lamp at a scan speed of 0.50 cm/sec. An argon atmosphere was used. The radiation intensity level was set at 1.0 kW/cm$^2$. A fully dense 3175 micron thick iron chromium foil was produced. Metallography revealed the resulting foil had a density in excess of 98%. Cross sections of the resulting structure are depicted in FIGS. 1a, 1b, 1c and 1d. The figures show low foil porosity.

EXAMPLE 2

A powdered nickel based mixture containing 70 vol. % tungsten carbide was combined with a fluorinated polymer based binder at room temperature to form a green sheet. A separate preheat stage was used to burn off the binder. In the preheat stage, 33 kW of radiant power was applied to the green sheet for 2 minutes resulting in a green sheet surface temperature of approximately 400° C., which was sufficient to burn off the binder. The green sheet was then loaded into an aluminum process box having a quartz window and the box was scanned under the lamp at a scan speed of 2 cm/sec. An argon atmosphere was used. The radiation intensity level was set at 1.0 kW/cm$^2$. A fully dense 7 micron thick foil was produced.

EXAMPLE 3

Figure 2A:
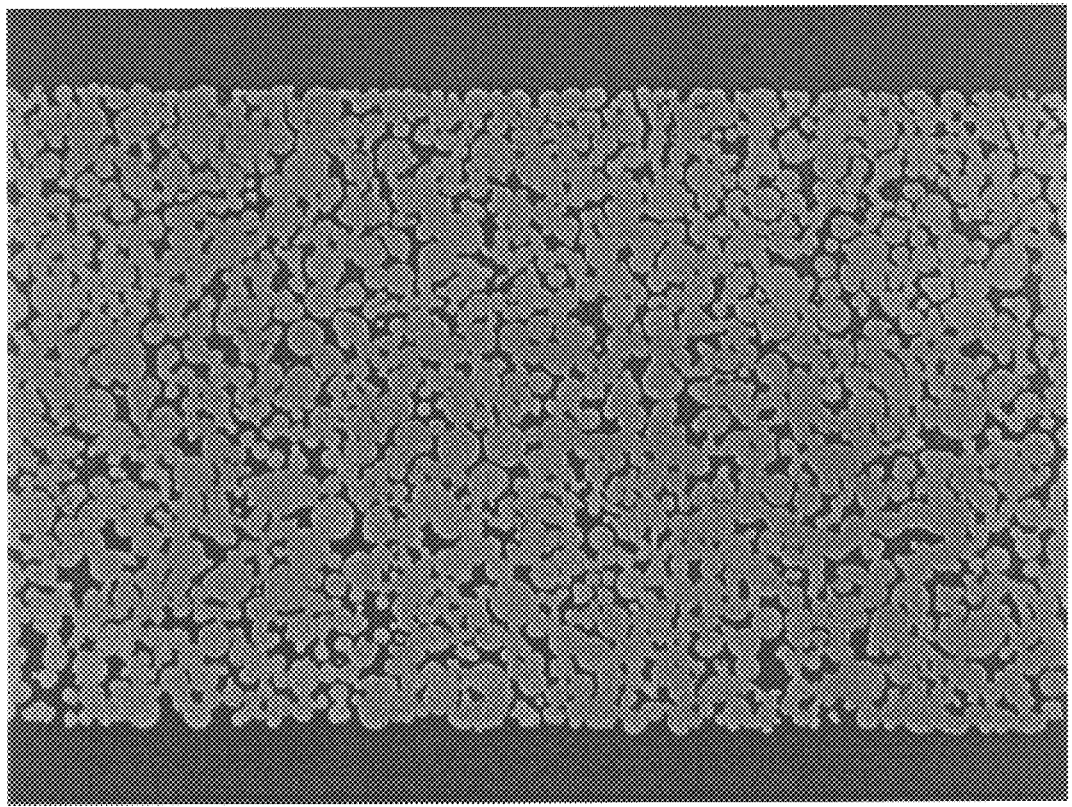
FIG. 2a illustrates grains of Fe-Al before radiation.
Figure 2B:
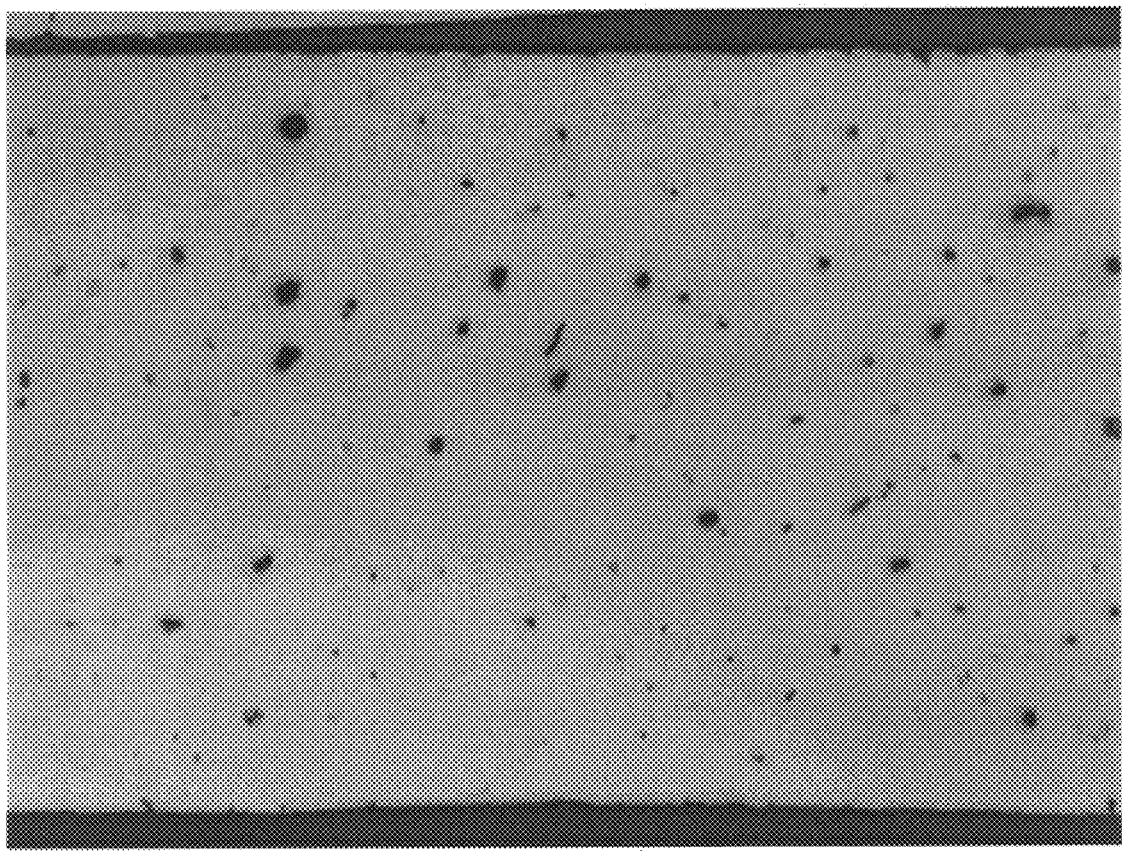
FIG. 2b illustrates a cleaved sample produced by the process of the invention.
Figure 2C:
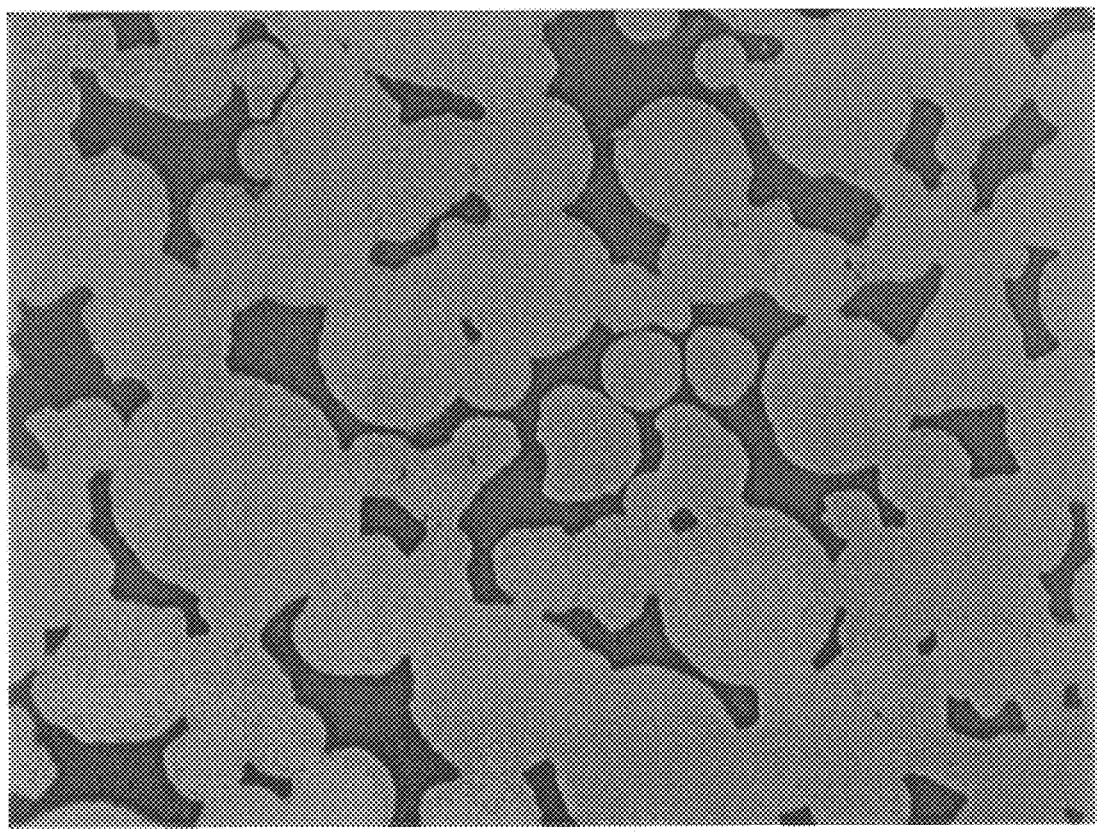
FIG. 2c and FIG. 2d illustrate grains of Fe—Al before and after radiation, magnified 5× relative to FIG. 2a and FIG. 2b.
Figure 2D:
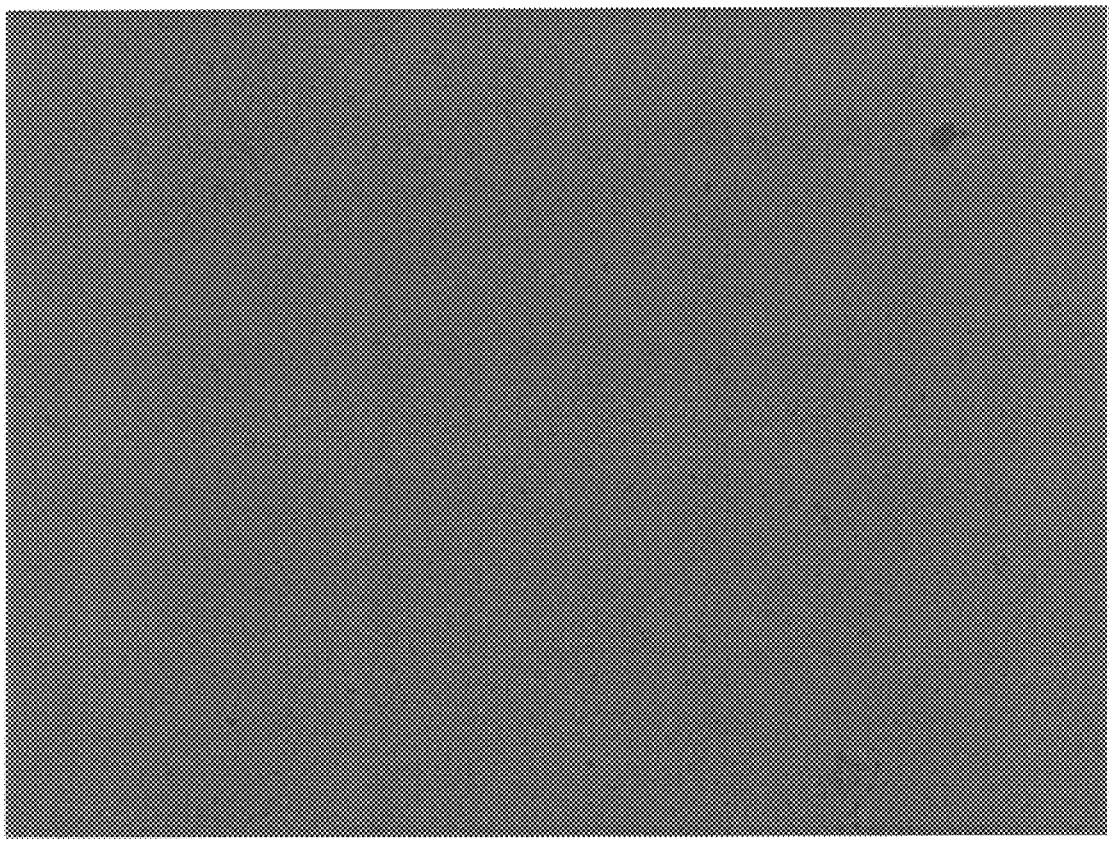

A iron aluminide powder was combined with a fluorinated polymer based binder at room temperature to form a green sheet. A separate preheat stage was used to burn off the binder. In the preheat stage, 33 kW of radiant power was applied to the green sheet for 2 minutes resulting in a green sheet surface temperature of approximately 400° C., which was sufficient to burn off the binder. The green sheet was then loaded into an aluminum process box having a quartz window and the box was scanned under the lamp at a scan speed of 5.0 cm/sec. The radiation intensity level was set at 1.0 kW/cm$^2$. An argon atmosphere was used. Foil was produced with densification levels of 60 to 100%. Cross sections of pre scan structures are depicted in FIGS. 2a and 2c, while the resulting structure following scan are depicted in FIGS. 2b and 2d and show the formation of low porosity foils.

While preferred embodiments of the invention have been illustrated and described, the invention is not so limited. Modifications, changes, variations, substitutions and equivalents will occur to those skilled in the art without departing from the spirit and scope of the present invention.

What is claimed is:

1. A method for preparing foils, comprising the steps of:
   mixing a powder composition with a binder to form a green sheet;
   exposing said green sheet to a plasma radiation source, said radiation source emitting directional radiation, said radiation adapted to heat said green sheet, wherein a heated foil is formed, and
   cooling said heated foil, wherein a foil including said composition is obtained.

2. The method of claim 1, wherein said foil provides a density of at least 98% of that of said composition in single crystal form, said exposing step being the only mechanical or heating step used.

3. The method of claim 2, wherein the wavelength of said radiation is approximately 0.1 $\mu$m to 2.0 $\mu$m.

4. The method of claim 1, further comprising loading said green sheet into a process chamber which allows passage of radiation therein, wherein said green sheet is moved through said process chamber.

5. The method of claim 1, wherein said binder is a polymer.

6. The method of claim 5, further comprising a preheat step wherein said polymer binder is reduced to residual carbon prior to exposure of said green sheet to said radiation.

7. The method of claim 1, further comprising the step of translating said radiation source relative to said green sheet.

8. The method of claim 1, wherein said exposing step comprises melting the surface of said green sheet while not melting a sub-surface portion of said green sheet.

9. The method of claim 8, wherein said melted surface diffuses into said non-melted sub-surface portion.

10. The method of claim 4, further comprising the step of cooling said process chamber.

11. The method of claim 10, wherein said step of cooling said process chamber comprises contacting portions of said process chamber with a cooling fluid.

12. The method of claim 1, wherein said radiation intensity is from approximately 0.3 to 3.5 kW/cm$^2$.

13. The method of claim 4, further comprising the step of providing a non-oxidizing atmosphere to said process chamber.

14. The method of claim 13, wherein said one or more non-oxidizing gases are selected from the group consisting of hydrogen and noble gases.

15. The method of claim 1, wherein the thickness of said foil formed is 1 to 4000 microns.

16. The method of claim 1, further comprising the steps of rotating said green sheet 180°, re-exposing said green sheet to said radiation source, and cooling said green sheet.

17. The method of claim 1, wherein said powder is a ceramic.

18. The method of claim 17, wherein said ceramic is $MoSi_2$.

19. A method as recited in claim 1, wherein said powder is a metal.

20. The method of claim 19, wherein said metal is at least one selected from the group consisting of tungsten, iridium, tantalum, niobium, rhenium, nickel, iron and titanium.

21. The method of claim 1, wherein said powder is a metal alloy.

22. The method of claim 21, wherein said metal alloy is selected from the group consisting of iron-chromium, iron-aluminum, nickel-aluminum, titanium-aluminum and molybdenum-rhenium.

23. The method of claim 1, wherein said powder is a cermet.

24. The method of claim 23, wherein said cermet is selected from the group consisting of chromium carbide with nickel alloy, chromium carbide with copper alloy, tungsten carbide with nickel alloy and tungsten carbide with copper alloy.

25. The method of claim 1, wherein said powder is a composite.

26. The method of claim 25, wherein said composite is selected from the group consisting of carbon reinforced titanium alloys, silicon carbide reinforced titanium, and metals reinforced with alumina.

27. A method as recited in claim 1, further comprising the step of cold-rolling said foil.

28. An apparatus for preparing a foil from powder, comprising:

a plasma radiation source adapted to emit radiation of wavelengths corresponding to an absorption spectrum of a green sheet which comprises a powder, said radiation source emitting directional radiation, structure for translating said green sheet relative to said plasma radiation source, wherein following exposure to said plasma radiation source a foil is obtained, and a process chamber.

29. The apparatus of claim 28 further comprising:

a structure for controlling the atmosphere in said chamber, and a structure for cooling said green sheet and said process chamber.

30. The apparatus of claim 29, wherein said process chamber has one or more areas which are substantially transparent to wavelengths radiated by said radiation source.

31. The apparatus of claim 30, wherein said transparent material is quartz.

32. The apparatus of claim 28, wherein said radiation source produces an intensity of up to 3.5 $kW/cm^2$.

33. The apparatus of claim 28, further comprising a structure for translating said green sheet under said radiation source.

34. The apparatus of claim 28, further comprising a cooling structure.

35. The apparatus of claim 28, wherein said radiation source is positioned inside said process chamber.

36. A method for preparing foils, comprising the steps of:

mixing a powder composition with a binder to form a green sheet;

exposing said green sheet to a plasma radiation source, said radiation source being adapted to melt a surface of said green sheet while not melting a sub-surface portion of said green sheet, wherein a heated foil is formed, and cooling said heated foil, wherein a foil including said composition is obtained.

* * * * *